United States Patent Office 3,511,796
Patented May 12, 1970

3,511,796
EXTINGUISHING POLYMER COMPOSITIONS CONTAINING TETRABROMOBICYCLONONANE
Harold A. Wright, Murrysville, Pa., assignor to Koppers Company, Inc., a corporation of Delaware
No Drawing. Original application June 16, 1966, Ser. No. 557,915, now Patent No. 3,456,022. Divided and this application Oct. 10, 1968, Ser. No. 785,420
Int. Cl. C08f 45/58; C08g 51/58; C08v 1/18
U.S. Cl. 260—2.5  6 Claims

ABSTRACT OF THE DISCLOSURE

Self-extinguishing polymer compositions are prepared by incorporating into the polymer composition 3,4,7,8-tetrabromo-4.3.0-bicyclononane. The addition of the solid 3,4,7,8-tetrabromo-4.3.0-bicyclononane does not cause plasticization of the polymer of deterioration of the molding properties, and being a white solid, does not discolor the polymer.

This case is a divisional application of Ser. No. 557,915, filed June 16, 1966, now U.S. Pat. No. 3,456,022.

---

This invention relates generally to a new self-extinguishing agent 3,4,7,8-tetrabromo-4.3.0-bicyclononane and self-extinguishing polymer compositions containing 3,4,7,8-tetrabromo-4.3.0-bicyclononane.

Polymer foams are so light in weight and have such good heat insulating qualities that their use in building construction is highly desirable. A prerequisite for such use is that the foam have fire-retardant properties. In the past, certain brominated organic compounds have been utilized for this purpose. While these compounds have been found to be effective to render the polymer compositions self-extinguishing, when used in amounts sufficient to achieve the desired degree of fire retardancy, the molding properties of the polymers are adversely affected. For example, in molding expandable styrene polymer beads containing self-extinguishing agents, it is found that the presence of the self-extinguishing agents causes poor fusion of the particles and shrinkage of the polymer foam. This is because the brominated compounds which have been found to be effective are either liquids or low-melting solids (i.e., melting points below 120° C.) and therefore, the compounds act to plasticize the polymer to such an extent that the molding properties deteriorate. As a result, the polymer's usefulness becomes marginal or submarginal for many applications where self-extinguishing properties are required such as the molding of insulation board for use in building panels.

I have discovered a novel compound 3,4,7,8-tetrabromo-4.3.0-bicyclononane:

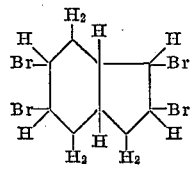

which has a relatively high melting point (153–154° C.). The compound remains in the solid state during the processing of the plastic at normal processing temperatures and therefore, does not act to plasticize the polymer and cause the molding properties to deteriorate. In spite of the relatively high melting point, the compound still acts to cause the polymer to be self-extinguishing. The compound has good hydrolytic stability and is white and thus imparts no color to the plastic. The novel compound is conveniently prepared by the bromination of 4.3.0-bicyclo-nonadiene-3,7.

According to this invention, self-extinguishing organic polymer compositions are provided by mixing with said polymer compositions 3,4,7,8-tetrabromo-4.3.0-bicyclononane. The self-extinguishing agent can be incorporated into the polymers either by adding it to a monomer and then polymerizing the monomer as well as by adding to the polymer. For example, it can be incorporated in the heat plastified polymer by mixing in conventional mixing and extrusion equipment prior to molding the polymer or while processing the polymer into pellets, which are a convenient form for molding. Alternatively, it can be added to the monomer mixture prior to the polymerization of the monomers by conventional methods such as suspension polymerization.

The 3,4,7,8-tetrabromo-4.3.0-bicyclononane can be used to render a variety of organic polymers self-extinguishing; for example, polymers and copolymers derived from such monomers as ethylene, propylene, styrene, isopropylstyrene, alpha-methylstyrene, nuclear methylstyrenes, chlorostyrenes, vinyl naphthalene, acrylonitrile, divinylbenzene, methyl methacrylate, butadiene, etc. While these polymers can include both foamed and non-foamed material, the novel self-extinguishing agent has been found to be particularly advantageous for use with polymer foams derived from vinyl aryl polymers such as polystyrene. A convenient form of polystyrene for molding into foamed articles is polystyrene beads prepared in aqueous suspension by a process such as is described for example in U.S. Pat. No. 2,907,756, wherein a vinyl aryl monomer is polymerized in aqueous suspension in the presence of a catalyst system of t-butylperbenzoate and benzoyl peroxide at a fixed time temperature cycle using suspending agents to maintain the monomer suspended in the aqueous medium in the form of particles or beads.

The polymer particles are rendered expandable by incorporating a blowing agent into the particles either during or after the polymerization. Processes for such incorporation are described in Pat. No. 3,192,169 and Pat. No 2,983,692. Preferred blowing agents include volatile aliphatic hydrocarbons containing from one to seven carbon atoms in the molecule, i.e., ethane, methane, propane butane, pentane, isopentane, hexane, heptane, cyclohexane and their halogenated derivatives which boil below the softening point of the polymer. Usually from 3–20% by weight of polymer of the blowing agent is incorporated therein.

The self-extinguishing agent is incorporated into the polymers in an amount of from about 1–15% by weight Below 1% by weight the desired self-extinguishing properties are not achieved and no advantage is obtained from using more than 15% by weight of the self-extinguishing agent. The preferred range of self-extinguishing agen would be from 1–5% by weight of polymer. If desired, organic peroxide synergists such as dicumyl peroxide, 2,5 dimethyl-2,5-di(t-butylperoxy)hexyne-3, di-t-butyl perox ide, cumyl tertiary-butyl peroxide, etc., can be added in amounts of about 0.1 to 2.0 percent by weight of polymer The peroxide synergist permits smaller amounts of the self-extinguishing agent to be employed while still pro ducing a self-extinguishing polymer.

The invention is further illustrated but not limited b the following examples wherein parts are parts by weigh unless otherwise indicated.

EXAMPLE I

To prepare the 3,4,7,8-tetrabromo-4.3.0-bicyclononan which is the novel self-extinguishing agent, 54 grams o 4.3.0-bicyclononadiene-3,7 was dissolved in 146 ml. o obenzene in a closed, 1-liter flask equipped with an
tator and thermometer. The solution was chilled to
emperature of 0–2° C. in an ice water bath. When
 temperature reached 0–2° C. to a dropping funnel
unted on the flask was added 54 ml. of nitrobenzene
l then 158 grams of bromine was dissolved in the
obenzene. The solution of bromine was slowly added
the flask containing the 4.3.0-bicyclononadiene-3,7 in
obenzene with agitation and cooling to maintain the
ction temperature below 15° C. The reaction was
hly exothermic. After all of the solution of bromine
l been added, which took 50 minutes, the agitation
the mass was continued for an additional 90 minutes
h the temperature being gradually decreased to 0–2° C.
: cold reaction mixture was then filtered on a fritted
ss funnel which took 20 minutes. The filter cake was
urried in the funnel with 100 ml. of hexane and the
ane removed by filtration. The hexane wash was re-
ted three more times each with 100 ml. of hexane,
r which time the yield of about 70 grams of solids
air dried to a fine cream colored powder. The powder
recrystallized from acetone and washed with metha-
The white crystalline product had a melting point of
–154° C. The yield of purified 3,4,7,8-tetrabromo-
0-bicyclononane was about 59 grams or about 30%.
analysis the bromine content was found to be 72.7%
:oretical 72.7%).

EXAMPLE II o incorporate the self-extinguishing agent by adding
) the monomer and then polymerizing the monomer,
e was added to a crown-capped 12-ounce bottle 80.0
s of styrene monomer having dissolved therein 1.6
s of the self-extinguishing agent, 3,4,7,8-tetrabromo-
)-bicyclononane, 0.20 part of the catalyst consisting
.16 part of benzoyl peroxide and 0.04 part of t-butyl
lenzoate, and as the self-extinguishing synergist, 0.28
 of 2,5-dimethyl-2,5-di(t-butylperoxy)hexyne-3. To
bottle was then added the suepending medium which
120 parts of water containing as suspension aids .15
of hydroxyethylcellulose and .06 part of tetrasodium
)phosphate. The bottles were placed in an oil bath
the styrene monomer polymerized with end-over-end
ttion for 8 hours at 90° C. after which the tempera-
was increased to 115° C. during one-half hour and
ntained at 115° C. for four hours. The bottle was
cooled to 30° C., opened, and the product polymer
ls were rendered expandable by adding to the bottle
ispersion aids, 2.4 parts of sodium chloride and 2 parts
.5% by weight aqueous solution of polyoxyethylene
) sorbitan monolaurate, and 6.5 parts of the blowing
it, n-pentane. The bottle was capped and rotated in
il bath for ten hours at 100° C. to incorporate the
ane mixture into the beads. The beads were separated
ɪ the suspension medium by filtration and air dried,
r being thoroughly washed with water.

he dry beads were then expanded in atmoshperic steam
2–4 minutes to a density of approximately 1.36
'cu. ft. The beads were permitted to age for 24 hours
ne atmosphere and the pre-expanded beads were then
ded into a ½" x 5" x 5" block between the platens of
lectrically heated press. The foam block had a density
.36 lbs./cu. ft. and the fusion was excellent.

he foam block was cut into five one-inch strips and
strips conditioned overnight in a 50–60° C. oven to
ove any residual blowing agent. Self-extinguishing
: were conducted on the foam strips, suspended ver-
ly in a draft-free hood and ignited by holding a ½-
. flame from a micro burner in contact with the bot-
of each strip for from 3–5 seconds. The average time
xtinguishment of sustained burning after the flame
removed from the strips for the five strips was 0.2
nd. An average time to extinguishment of 1.0 second
ss is considered to be adequate for commercial accept-
ity.

EXAMPLE III

To illustrate the effect of variation in the quantity of
self-extinguishing agent, there was added to a number of
12-ounce crown-capped bottles in the following order:

120 parts of water containing therein, as suspending
agents, 0.64 part of tricalcium phosphate and .0048 part
of dodecylbenzene sodium sulfonate (Nacconol NRSF)
along with 80 parts of the monomer styrene containing
0.36 part of the catalyst consisting of 0.24 part of benzoyl
peroxide and 0.12 part of t-butyl perbenzoate along with
0.28 part of the self-extiguishing synergist 2,5-dimethyl-
2,5-di(t-butylperoxy)hexyne-3 and X parts of the self-
extinguishing agent 3,4,7,8-tetrabromo-4,3,0-bicyclono-
nane, where X is the percent by weight based on styrene
shown in Table I below. The bottles were capped and
rotated end-over-end in an oil bath for 7 hours at 92° C.
The bottles were then cooled to 25° C. and there was
added to each bottle 0.8 part of tricalcium phosphate and
0.008 part of Nacconol NRSF as additional dispersing
agents along with 1.2 parts of sodium chloride and 7.0
parts of the blowing agent, n-pentane. The bottles were
recapped and heated with end-over-end agitation for one
hour at 92° C. The temperature was then raised to 115° C.
which took 20 minutes and maintained at 115° C. for
an additional 4 hours to impregnate the beads with blow-
ing agent and complete the polymerization. Each group
of product polymer beads were separated from the aque-
ous medium by filtration and thoroughly washed with
water and air dried on trays.

Aliquots of the beads were pre-expanded in atmospheric
steam for 2–4 minutes to the densities shown in Table I.
Portions of each group of pre-expanded beads were then
molded into ½" x 5" x 5" blocks. The fusion in each
case was excellent. The foam block was cut into five one-
inch strips and the strips conditioned as described in Ex-
ample II and the self-extinguishing time of each strip
was determined as described in Example II with the time
to extinguishment shown in Table I below. It can be seen
that the self-extinguishing characteristics of those foams
having 2% or more of the novel self-extinguishing agent
had exceptional average times to extinguishment (0.2 sec-
ond). Even in the case of the foam containing 3% by
weight self-extinguishing agent, the shrinkage of the foams
was nil. In contrast, shrinkage of foam prepared by the
same procedure except containing 3% by weight of the
well-known fire-retardant, Firemaster T–23P (tris-(2,3-
dibromopropyl)phosphate) instead of the tetrabromobi-
cyclononane was so great that it was commercially un-
usable. Furthermore, whereas as shown in Table I, the
novel tetrabromobicyclononane is effective at concentra-
tion levels of one percent, foams containing Firemaster
T–23P require a level of at least two percent in order to
be effective.

EXAMPLE IV

A mixture of 98 parts of crystal polystyrene (Dylene®
8, Sinclair-Koppers Company) and 2 parts of 3,4,7,8-
tetrabromo-4.3.0-bicyclononane were added to the hop-
per of a conventional heated extruder wherein the poly-
styrene was heated to a plastifying temperature and the
tetrabromobicyclononane thoroughly dispersed within
the heat-plastified polystyrene. The material was extruded
in the form of thin strands which were passed through a
cooling bath and then to a pelletizer where they were cut
into small pellets.

Portions of the pellets were injection molded into bars
having the dimensions of 8" x ½" x ⅛". Each bar was
suspended at a 45° angle in a draft-free hood and the tip
of a ½" frame from a micro burner held in contact with
the lower edge of the bar for 5–10 seconds to ignite the
plastic and then the flame was removed and the time to
extinguishment of the flame was measured. The average
time to extinguishment was 15 seconds. An extinguish-
ment time of 20 seconds is adequate for commercial ac-
ceptability.

TABLE I

| | Self-extinguishing agent | Percent by weight of polymer of self-extinguishing agent | lbs./cu. ft. Pre-expanded beads | lbs./cu. ft. Molded block | Shrinkage of molded foam | Average extinguishment time |
|---|---|---|---|---|---|---|
| III-1 | 3,4,7,8-tetrabromo-4.3.0-bicyclononane | .5 | 1.9 | 1.9 | Nil | Burned |
| III-2 | do | 1.0 | 1.7 | 1.7 | Nil | 1.0 |
| III-3 | do | 1.5 | 1.8 | 1.8 | Nil | 0.8 |
| III-4 | do | 2.0 | 1.3 | 1.3 | Nil | 0.2 |
| III-5 | do | 2.5 | 1.7 | 1.7 | Nil | 0.2 |
| III-6 | do | 3.0 | 1.5 | 1.5 | Nil | 0.2 |
| III-7 | Firemaster T-23P (tris-(2,3-dibromopropyl)phosphate) | 3.0 | 1.9 | 3.0 | Gross | 0.5 |
| III-8 | do | 2.0 | 1.8 | 2.5 | Slight | 0.7 |
| III-9 | do | 1.5 | 1.7 | 2.0 | do | Burned |

The foregoing has described a novel compound 3,4,7,8-tetrabromo-4.3.0-bicyclononane which has been found to be an effective self-extinguishing agent for organic polymers yet does not act to plasticize the polymers and thereby cause their molding properties to deteriorate.

I claim:

1. A self-extinguishing polymer composition comprising an organic polymer and from about 1 to 15 percent by weight of polymer of 3,4,7,8-tetrabromo-4.3.0-bicyclononane.

2. The composition of claim 1 wherein the organic polymer is the polymerization product of a monomer selected from the group consisting of ethylene, propylene, styrene, isopropyl, styrene, alpha-methylstyrene, nuclear methylstyrenes, chlorostyrenes, acrylonitrile, divinylbenzene, methyl methacrylate, butadiene and mixtures thereof.

3. The composition of claim 1 wherein the organic polymer is a vinyl aryl polymer.

4. The composition of claim 3 wherein the vinyl aryl polymer has incorporated therein from two to twenty parts by weight of an organic blowing agent.

5. A self-extinguishing polymer foam prepared by heating the composition of claim 4.

6. The composition of claim 4 wherein there is incorporated from .1 to 2.0 percent by weight of polymer of an organic peroxide synergist.

References Cited

UNITED STATES PATENTS 3,455,873  7/1969  Jenker _____ 260—2.5
3,456,022  7/1969  Wright _____ 260—648

SAMUEL H. BLECH, Primary Examiner

M. FOELAK, Assistant Examiner

U.S. Cl. X.R.

260—45.7, 648